United States Patent
Ashikawa et al.

(10) Patent No.: US 7,316,314 B2
(45) Date of Patent: Jan. 8, 2008

(54) TAPE CASSETTE STORING CASE WITH STACKING RIBS

(75) Inventors: Teruo Ashikawa, Kanagawa (JP); Hiroyuki Naito, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 320 days.

(21) Appl. No.: 10/857,496

(22) Filed: Jun. 1, 2004

(65) Prior Publication Data

US 2004/0251155 A1 Dec. 16, 2004

(30) Foreign Application Priority Data

Jun. 11, 2003 (JP) .......................... P.2003-166555

(51) Int. Cl.
 *B65D 85/30* (2006.01)
(52) U.S. Cl. .................... 206/387.1; 206/509
(58) Field of Classification Search ............. 206/387.1, 206/387.11, 387.12, 387.13, 387.14, 503, 206/508–511
See application file for complete search history.

(56) References Cited

U.S. PATENT DOCUMENTS

| | | | | |
|---|---|---|---|---|
| 3,642,337 A | * | 2/1972 | Manheim | 206/387.12 |
| 4,193,497 A | * | 3/1980 | McDermott et al. | 206/387.1 |
| 4,306,655 A | * | 12/1981 | Smith | 206/387.14 |
| 4,557,533 A | | 12/1985 | Koch | |
| 4,889,235 A | * | 12/1989 | Hess | 206/511 |
| 5,125,511 A | | 6/1992 | Chamberlin | |
| 5,186,338 A | * | 2/1993 | Boutet | 206/509 |
| 5,964,349 A | * | 10/1999 | Odagiri | 206/387.1 |
| 6,640,972 B2 | * | 11/2003 | Morita | 206/387.14 |
| 6,657,817 B2 | * | 12/2003 | Morita | 206/387.1 |
| 2003/0146127 A1 | * | 8/2003 | Morita | 206/508 |
| 2004/0045849 A1 | * | 3/2004 | Morita | 206/387.1 |

FOREIGN PATENT DOCUMENTS

| | | |
|---|---|---|
| EP | 0 182 721 A2 | 11/1985 |
| EP | 0 116 315 B1 | 5/1988 |
| EP | 0 952 584 A1 | 10/1999 |
| JP | 9-290885 A | 11/1997 |
| JP | 10-211984 A | 8/1998 |

OTHER PUBLICATIONS

European Search Report dated Jun. 19, 2007.

* cited by examiner

*Primary Examiner*—Bryon P. Gehman
(74) *Attorney, Agent, or Firm*—Sughrue Mion, PLLC

(57) ABSTRACT

A tape cassette storing case comprises: a storing case main body, the storing case main body having first and second side surfaces that are opposite to each other; a recess region on the first side surface, the recess region being defined by a step from the first side surface; and a plurality of ribs on the second side surface, wherein when two of the storing case main bodies including first and second main bodies are stacked so that the first side surface in the first main body are superposed on the second side surface in the second main body, the a plurality of ribs in the second main body is regulated by the step of the recess region on the first main body, and the plurality of ribs in the second main body each has an inclined surface with respect to the second side surface in the second main body.

15 Claims, 8 Drawing Sheets

TAPE CASSETTE STORING CASE WITH STACKING RIBS

BACKGROUND OF THE INVENTION

1. Field of the Invention

The present invention relates to a tape cassette storing case for storing a tape cassette used in a VTR (Video Tape Recorder).

2. Description of the Related Art

In the related art, the tape cassettes are widely used. In order to protect these tape cassettes from dust, a shock given in falling, etc., the tape cassettes are put into the tape cassette storing case (also referred to as a "storing case" hereinafter) and then carried/stored (for example, see JP-A-10-211984).

Meanwhile, sometimes mutual stacked positions of the storing cases are displaced due to vibration of a push car during when the storing cases in which the tape cassette is kept respectively are stacked in the vertical direction and then loaded on the push car to transport, etc., so that the storing cases lose their balance and fall down. Thus, such storing cases were hard to handle.

Also, in order to prevent the mutual displacement between the stacked storing cases, such a structure is thought of that uneven portions are provided to their stacked positions of the storing cases to engage with each other. However, when the storing cases are aligned in the rack to store, such storing cases are hard to take out since the uneven portions are engaged mutually in their stacked positions of the storing cases. Conversely, such structure was difficult to handle.

For this reason, the tape cassette storing case convenient for handling was requested strongly such that the stacked storing cases can be prevented from falling down in transport, etc., it is easy to take out the selected storing case appropriately from the stacked storing cases in storing, etc., and so forth.

SUMMARY OF THE INVENTION

The present invention has been made in view of the above circumstances, and it is an object of the present invention to provide a tape cassette storing case that is convenient for any handling of the tape cassette storing case such as transportation, storage, or the like.

The above object of the present invention can be attained by providing a tape cassette storing case comprising a storing case main body for storing a tape cassette, the storing case main body having a first side surface and a second side surface that is opposite to the first side surface; a recess region on the first side surface, the recess region being defined by a step from the first side surface; and a plurality of ribs on the second side surface, wherein when two of the storing case main bodies including a first main body and a second main body are stacked so that the first side surface in the first main body are superposed on the second side surface in the second main body, the plurality of ribs in the second main body are regulated by the step of the recess region on the first main body, and said a plurality of ribs in the second main body each has an inclined surface with respect to the second side surface in the second main body.

According to the tape cassette storing case, when the storing cases are stacked mutually in transportation, a plurality of ribs provided to the second side surface (one of a front side surface and a back side surface) of the storing case are positioned within the recess region of the stacked storing cases. Even though the storing cases are moved relatively by the vibration, the ribs are regulated by the step that define the recess region and thus displacement between positions of the stacked storing cases can be prevented. Therefore, it can be prevented that the stacked storing cases lose their balance and fall down in transportation. Also, in the situation that any storing case is to be taken out from a plurality of storing cases that are stacked and stored in a rack, if the user applies a force (force that is larger than a displacing force generated by the vibration in transportation) to the storing case in a predetermined direction while clamping the storing case with the user's fingers, the ribs of the clamped storing case are caused by the inclined surfaces to run on the step and are moved to the outer side of the recess region. In this manner, regulation of the movement of the storing cases can be released and thus the storing case can be taken out. As a result, such an event can be prevented that the storing case adjacent to the taken-out storing case is pulled out from the proper storing position because the adjacent storing case follows the taken-out storing case. In this way, the troublesome operation to take out a desired storing case while holding down the storing cases that should not be pulled out is not required of the user, so that the user can easily take out the desired storing case.

Also, when the storing cases are aligned to store, or the like, the stacked position is made constant between all storing cases since the ribs are regulated between the stacked storing cases by the step that define the recess region. Therefore, when plural storing cases are stored, or the like, such storing cases can be aligned in a regular manner along the stacking direction and are ready to stock.

In the above tape cassette storing case, it is preferable that a tape cassette storing case further comprises a sheet member on the recess region.

The sheet member preferably has a coefficient of friction larger than any other portion than the sheet member. Normally the sheet member provided in the recess region is made of a resin whose coefficient of friction is larger than a resin constituting any other portion than the sheet member of the storing case. Therefore, if the projected surfaces of the ribs are slid on the sheet member of the recess region in a state that a plurality of ribs are positioned with in the recess region, a larger coefficient of friction than the case that the projected surfaces are slid on remaining portions of the storing case in the related art can be obtained. As a result, relative displacement between the stacked storing cases can be suppressed more conspicuously. At this time, a coefficient of friction of the sliding portion between the ribs and the recess region can be adjusted appropriately by changing the type of the resin constituting the sheet member.

Therefore, the tape cassette storing case according to the present invention is convenient for any handling of the tape cassette storing case such as transportation, storage, or the like.

In the above tape cassette storing case, it is preferable that the inclined surface and second side surface define an angle of 20° to 50°.

In the above tape cassette storing case, it is preferable that when two of the storing case main bodies including a first main body and a second main body are stacked so that the first side surface in the first main body are superposed on the first side surface in the second main body, the plurality of ribs in the first main body are capable of engaging with the plurality of ribs on the second main body.

In the above tape cassette storing case, it is preferable that a height of the step is set excess of a thickness dimension of the sheet member.

In the above tape cassette storing case, it is preferable that at least portion of the sheet member formed of a resin is deposited in the recess region to form a sheet deposition portion, and the step comprises the sheet deposition portion.

In the above tape cassette storing case, it is preferable that the plurality of ribs are provided at predetermined interval.

In the above tape cassette storing case, it is preferable that the inclined surface is inclined in a longitudinal direction of the second side surface.

In the above tape cassette storing case, it is preferable that the inclined surface is inclined in a lateral direction of the second side surface.

In the above tape cassette storing case, it is preferable that each of the ribs comprises a first inclined surface in a longitudinal direction of the second side surface and a second inclined surface in a lateral direction of the second side surface.

DETAILED DESCRIPTION OF THE INVENTION

An embodiment of the present invention will be explained in detail with reference to the drawings hereinafter.

Figure 1:
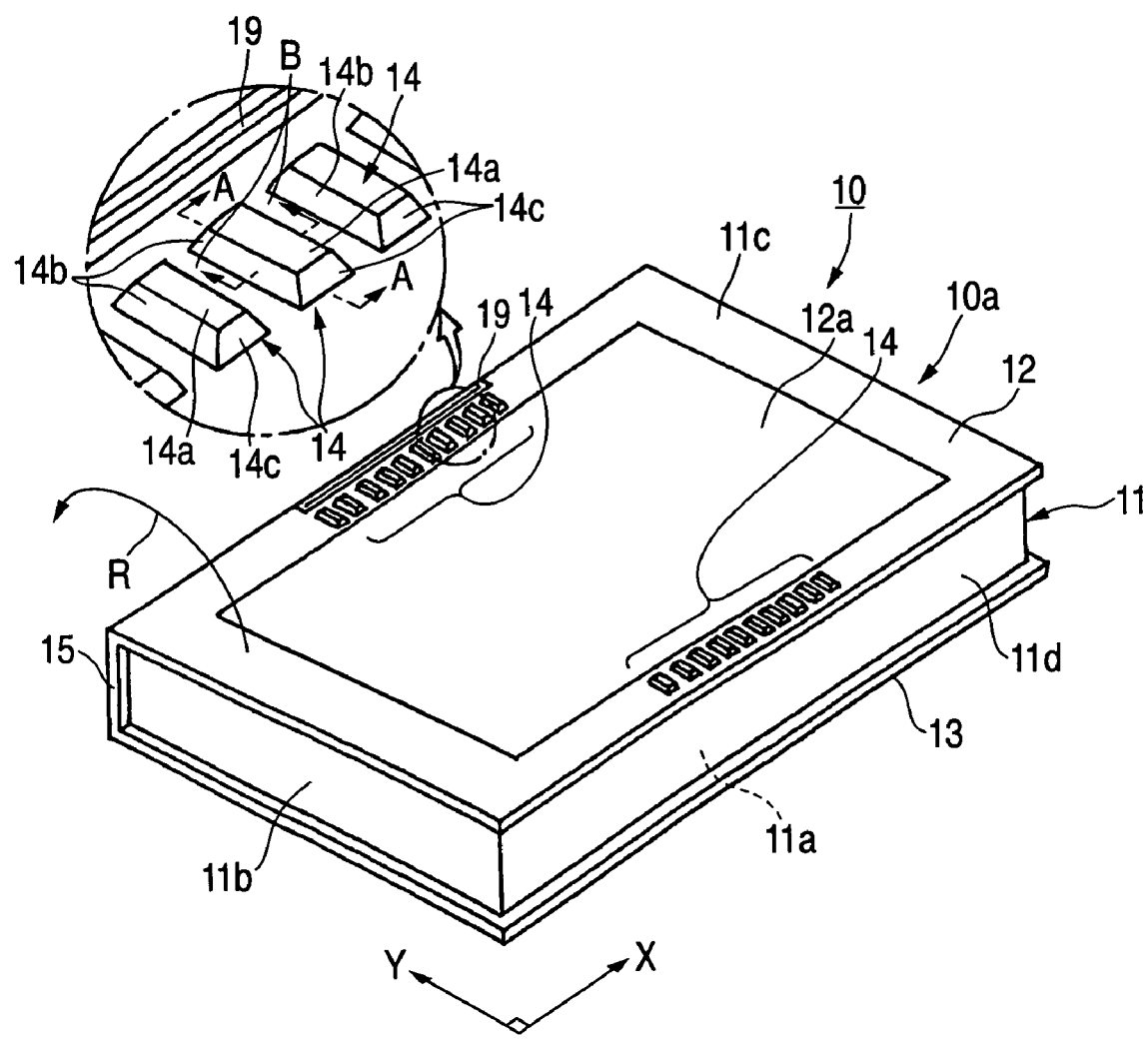
FIG. 1 is an overall perspective view showing a front side surface of a tape cassette storing case according to an embodiment of the present invention.
Figure 2:
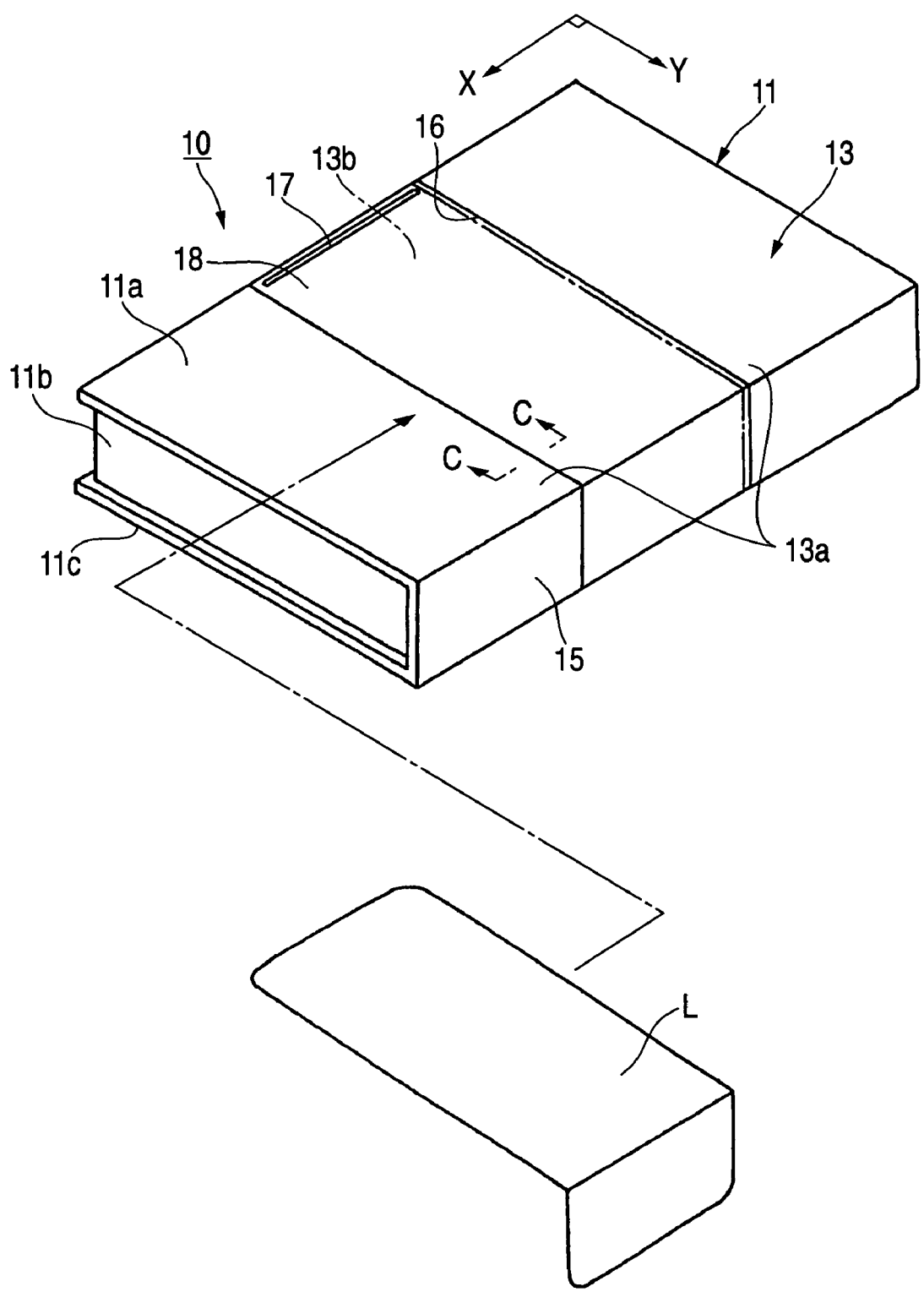
FIG. 2 is an overall perspective view showing a back side surface of the tape cassette storing case according to the embodiment of the present invention.
Figure 3:
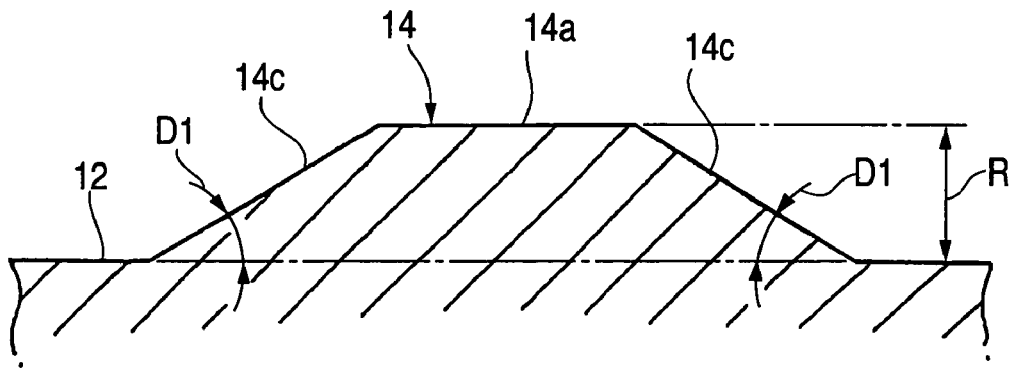
FIG. 3 is a sectional view taken along an A-A line in FIG. 1.
Figure 4:
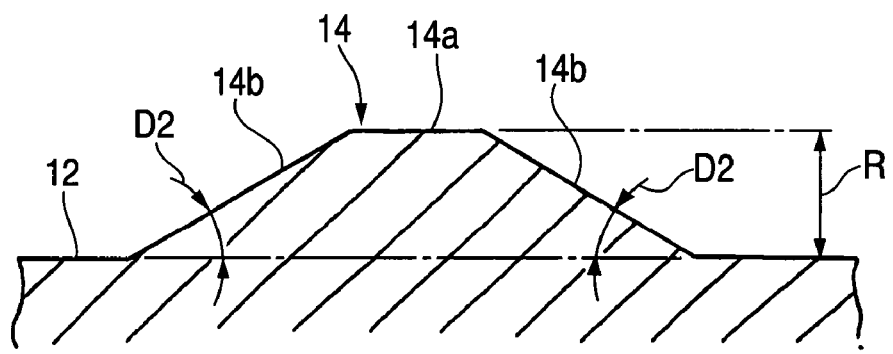
FIG. 4 is a sectional view taken along a B-B line in FIG. 1.
Figure 5:
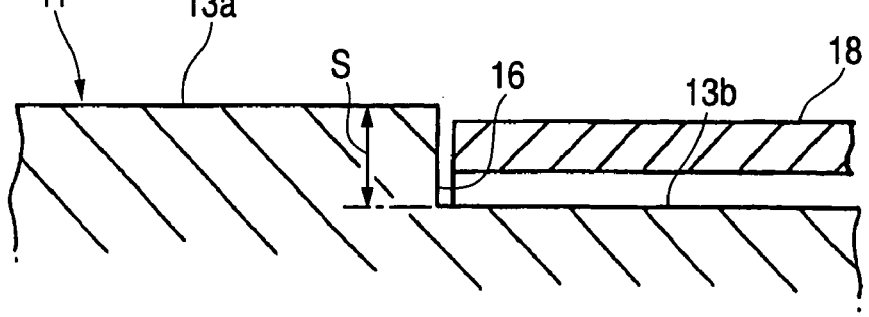
FIG. 5 is a sectional view taken along a C-C line in FIG. 2.

FIG. 1 is an overall perspective view showing a front side surface of a tape cassette storing case according to the present invention, FIG. 2 is an overall perspective view showing a back side surface of the storing case shown in FIG. 1, FIG. 3 is a sectional view taken along an A-A line in FIG. 1, FIG. 4 is a sectional view taken along a B-B line in FIG. 1, and FIG. 5 is a sectional view taken along a C-C line in FIG. 2.

A tape cassette storing case 10 shown in FIG. 1 is normally called a hard case. The storing case 10 is made of polypropylene, or the like.

The storing case 10 includes a storing case main body 10a. The storing case main body 10a has a storage portion 11 and a lid portion 11c coupled to the storage portion 11. The storage portion 11 has a rectangular bottom plate 11a, side walls 11b provided upright along both short sides of the bottom plate 11a, and an end wall 11d provided upright along one long side of the bottom plate 11a. A space into which the tape cassette is kept is defined on the inner side of the storing case main body 10a by the bottom plate 11a, the side walls 11b, and the end wall 11d.

A coupling piece 15 is provided foldably along the other long side of the bottom plate 11a via a hinge portion, or the like.

The lid portion 11c has a rectangular shape with the same area as the bottom plate 11a of the storage portion 11. The coupling piece 15 is coupled foldably to one long side of the lid portion 11c via a hinge portion, or the like.

The storing case 10 has a structure that can store the tape cassette by turning the coupling piece 15 and the lid portion 11c from a base portion of the storage portion 11 in the R direction indicated with an arrow in FIG. 1 to open.

Here, in the storing case 10 of the present embodiment, an upper surface of the lid portion 11c shown in FIG. 1 is assumed as a front side surface 12 (second side surface), and an upper surface of the bottom plate 11a of the storage portion 11 shown in FIG. 2 is assumed as a back side surface 13 (first side surface).

As shown in FIG. 1, a rectangular window portion 12a when viewed from the upper side of the front side surface 12 is provided in the lid portion 11c. The window portion 12a is made of transparent resin. The user can check with eye via the window portion 12a whether or not the tape cassette is kept in an inside of the storage portion 11.

As shown in FIG. 1, a plurality of ribs 14 are projected from the front side surface 12 of the storing case 10 between the long side of the lid portion 11c and the long side of the window portion 12a respectively.

A plurality of ribs 14 are provided at a predetermined interval along the longitudinal direction (the X direction indicated with an arrow in FIG. 1) of the storing case 10 respectively. In FIG. 1, such a structure is illustrated that respective ten ribs 14 are provided on both long sides, but the number of the ribs 14 is not particularly limited.

As shown in FIG. 2, flat surfaces 13a positioned on both short side sides of the bottom plate 11a, and a strip-like recess region 13b partitioned between these flat surfaces 13a by a step 16 are provided to the back side surface 13 of the storing case 10. The recess region 13b is provided to expand from a center portion of one long side of the back side surface 13 of the storing case 10 to a center portion of one side of the lid portion 11c via the coupling piece 15. A sheet member 18 made of transparent polypropylene, or the like is provided in the recess region 13b. The sheet member 18 has a strip shape along a peripheral edge of the recess region 13b, and one end of this sheet member 18 is thermally deposited to a sheet deposition portion 17 at an end portion of the bottom plate 11a on the long side in the recess region 13b. The other end of the sheet member 18 is thermally deposited to a sheet deposition portion 19 at a center portion of one long side of the lid portion 11c in the recess region 13b. In this manner, a pocket is defined by depositing/fixing the sheet member 18 to the recess region 13b, and a case card L for recording product information, etc. of the magnetic cassette tape held in the storing case 10 is stored in this pocket, as indicated with an arrow in FIG. 2.

Here, the sheet deposition portion 17 has a projected shape by a raise formed by the deposition. At this time, such projected shape is formed to have a projected height of 0.1 mm to 0.3 mm.

Next, a shape of the rib will be explained with reference to FIG. 1, FIG. 3 and FIG. 4 hereunder.

As shown in FIG. 1, the rib 14 has a rectangular shape that has a long side along the lateral direction (Y direction indicated with an arrow in FIG. 1) of the storing case 10 when viewed from the upper side of the front side surface 12.

The rib 14 has a rectangular projected surface 14a, inclined surfaces 14b (first inclined surfaces) formed to extend to both long sides of the projected surface 14a from the front side surface 12, and inclined surfaces 14c (second inclined surfaces) formed to extend to both short sides of the projected surface 14a from the front side surface 12.

As shown in FIG. 3, the rib 14 is constructed such that the inclined surface 14c is inclined at a predetermined angle D1 to the front side surface 12 and the projected surface 14a has a height R from the front side surface 12. Also, as shown in FIG. 4, the rib 14 is constructed such that the inclined surface 14b is inclined at a predetermined angle D2 to the front side surface 12 and the projected surface 14a has the height R from the front side surface 12. In the present embodiment, the angle D1 is set to 30°, the angle D2 is set to 30°, and the height R of the rib 14 is set to 0.3 mm. Also, the angles D1, D2 are not limited to those in the present embodiment. It is preferable that the angle D1 should be set to 20° to 50°, and it is preferable that the angle D2 should be set to 20° to 50°.

As shown in FIG. 5, a height S of the step 16 from the flat surface 13a to the recess region 13b is set in excess of a thickness dimension of the sheet member 18. In the present embodiment, a thickness of the sheet member 18 is 0.15 mm and the height S of the step 16 is 0.4 mm.

Figure 6:
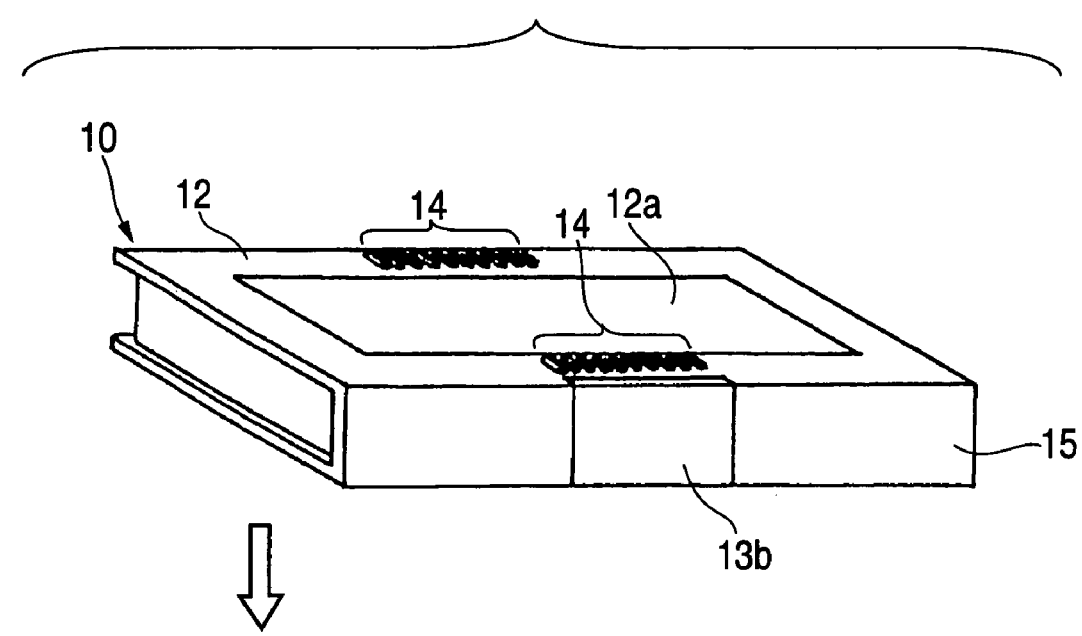
FIG. 6 is a view showing such a state that a plurality of storing cases are stacked.
Figure 6:
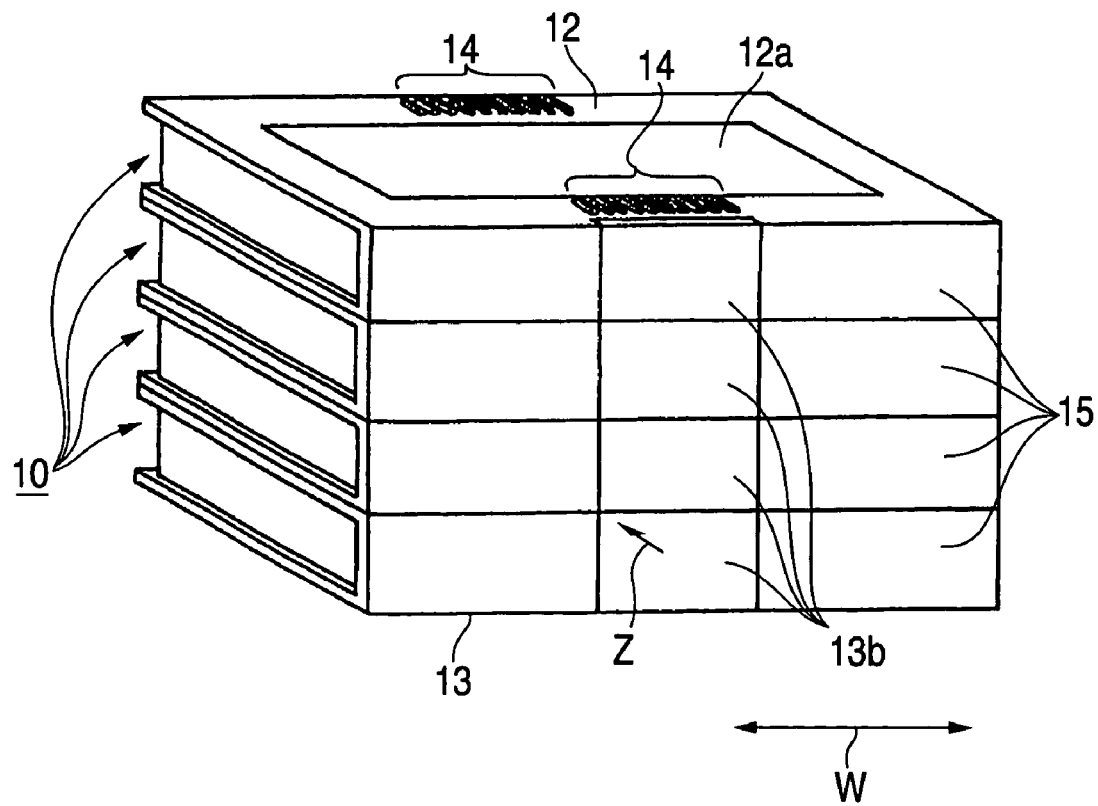
Figure 7:
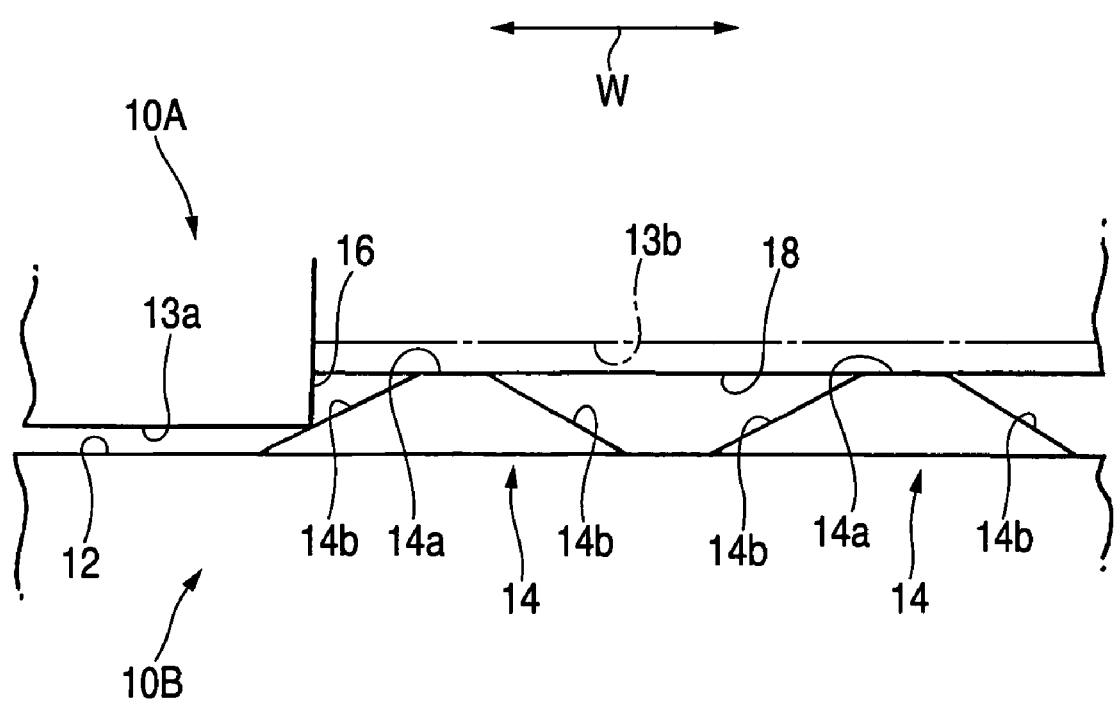
FIG. 7 is an enlarged view explaining a state viewed from the Z direction indicated with an arrow in FIG. 6.

Next, a state that plural pieces of storing cases 10 are stacked will be explained with reference to FIG. 6 hereunder. FIG. 6 is a view showing such a state that a plurality of storing cases are stacked. FIG. 7 is an enlarged view explaining the stacked portions of the storing cases in FIG. 6 viewed from the Z direction indicated with an arrow in FIG. 6.

As shown in FIG. 6 and FIG. 7, a plurality of ribs 14 are provided such that they are positioned in the recess region 13b when different storing case main bodies are stacked mutually to bring the front side surface 12 of one storing case into contact with the back side surface 13 of the other storing case.

The projected surfaces 14a come into contact with the recess region 13b via the sheet member 18 in a state that a plurality of ribs 14 are positioned within the recess region 13b. Then, when the stacked storing cases 10 are moved relatively in the longitudinal direction (direction indicated with an arrow W in FIGS. 6 and 7), the step 16 of an upper storing case 10A in FIG. 7 contacts the inclined surface 14b of the rib 14 of a lower storing case 10B in FIG. 7. Therefore, the rib 14 is regulated by the step 16 so that a movement of the rib 14 to the outer side of the recess region 13b can be prevented. Although not shown, similarly a movement of the rib is regulated by the step positioned on the opposite side in the direction indicated with the arrow W.

Also, as shown in FIG. 2, when a plurality of ribs 14 are moved in the lateral direction (opposite direction to the Y direction indicated with an arrow in FIG. 2) of the storing case 10 in a state that different storing case main bodies are stacked mutually via their front side surface 12 and back side surface 13, the inclined surfaces 14c of the ribs 14 (see FIG. 1) contacts the sheet deposition portion 17. In this way, it can be regulated that the stacked storing cases 10 are moved relatively in their mutual lateral direction.

According to the storing case 10, when the storing cases 10 are piled up mutually in transportation, a plurality of ribs 14 provided to the front side surface 12 of the storing case 10 are positioned within the recess region 13b of the stacked storing cases 10. Then, when the storing cases 10 are moved relatively, the ribs 14 come into contact with the step 16 or the sheet deposition portion 17 and thus displacement between relative positions of the stacked storing cases 10 can be regulated. Therefore, it can be prevented that the stacked storing cases 10 lose their balance and fall down in transportation.

Also, in the situation that any storing case 10 is to be taken out from a plurality of storing cases 10 that are stacked and stored in a rack or the like, if the user applies a force to the storing case 10 while clamping the storing case 10 with the user's fingers, the ribs 14 of the clamped storing case 10 are caused by the inclined surfaces 14b, 14c to run on the outside of the recess region 13b while contacting the step 16 or the sheet deposition portion 17. That is, if a force that is larger than a displacing force generated by the vibration in transportation is applied, regulation of the ribs 14 by the step can be easily released. In this manner, regulation of the movement of the storing cases 10 can be released and thus the storing case 10 can be moved relatively and taken out. As a result, such an event can be prevented that the storing case adjacent to the taken-out storing case 10 is pulled out from the proper storing position because the adjacent storing case follows the taken-out storing case 10.

In this fashion, the troublesome operation to take out a desired storing case while holding down the storing cases 10 that should not be pulled out is not required of the user, so that the user can easily take out the desired storing case.

Also, when the storing cases 10 are aligned to store, the stacked position is made constant between all storing cases 10 by positioning the ribs 14 in the recess region 13b between the stacked storing cases 10. Therefore, when plural storing cases 10 are stored, or the like, such storing cases 10 can be aligned in a regular manner along the stacking direction and are ready to stock.

In addition, normally the sheet member 18 provided in the recess region 13b is made of a resin whose coefficient of friction is larger than a resin constituting remaining portions of the storing case 10. Therefore, if the projected surfaces 14a of the ribs 14 are slid on the sheet member 18 of the recess region 13b in a state that a plurality of ribs 14 are positioned within the recess region 13b, a larger coefficient of friction than the case that the projected surfaces 14a are slid on remaining portions of the storing case 10 in the related art can be obtained. As a result, relative displacement between the stacked storing cases 10 can be suppressed more conspicuously. At this time, a coefficient of friction of the sliding portion between the ribs 14 and the recess region 13b can be adjusted appropriately by changing the type of the resin constituting the sheet member 18.

A plurality of ribs 14 function as a grip upon handling the storing case 10 by the user. Therefore, the user can handle easily the storing case 10 by clamping the ribs 14 with his or her fingers.

Therefore, the tape cassette storing case according to the present invention is convenient for any handling of the tape cassette storing case such as transportation, storage, or the like.

It is preferable that a plurality of ribs 14 of the storing case 10 should be formed to engage with a plurality of ribs 14 of the different storing case 10.

Figure 8:
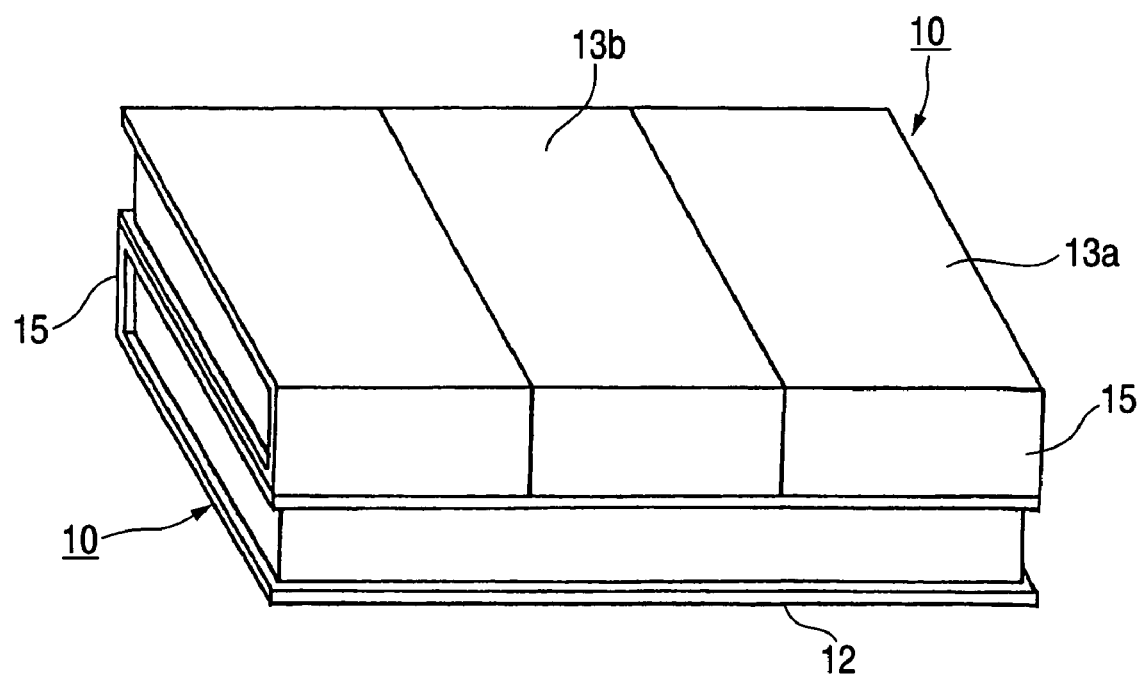
FIG. 8 is a view showing such a state that the storing cases are stacked via their front side surfaces.
Figure 9:
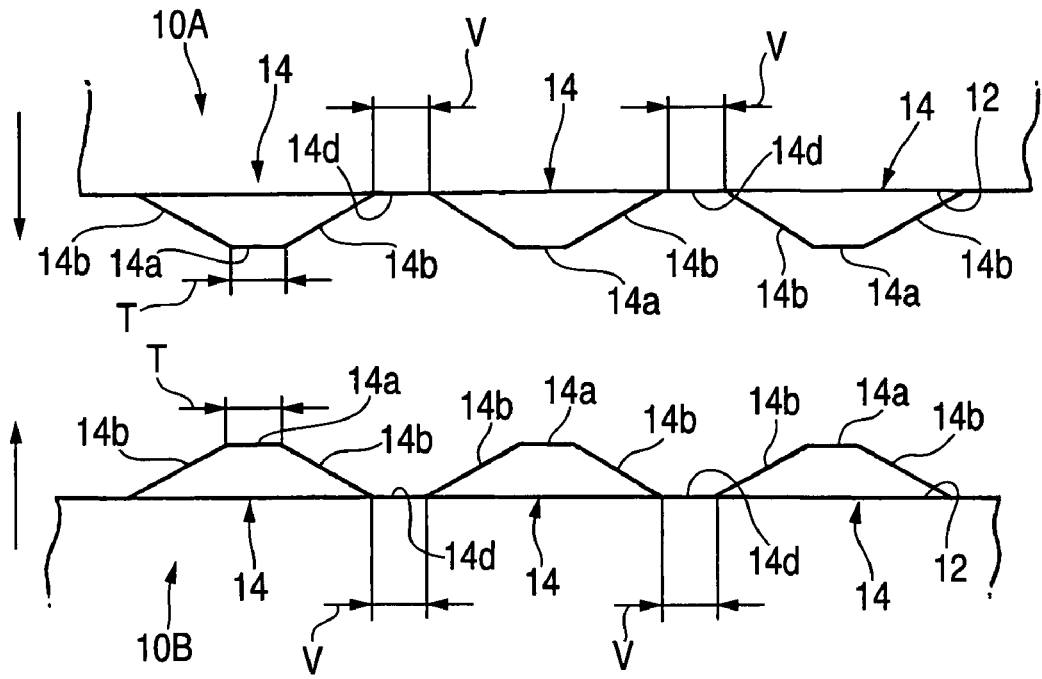
FIG. 9 is a view explaining such a state that a plurality of ribs are opposed mutually in FIG. 8.
Figure 10:
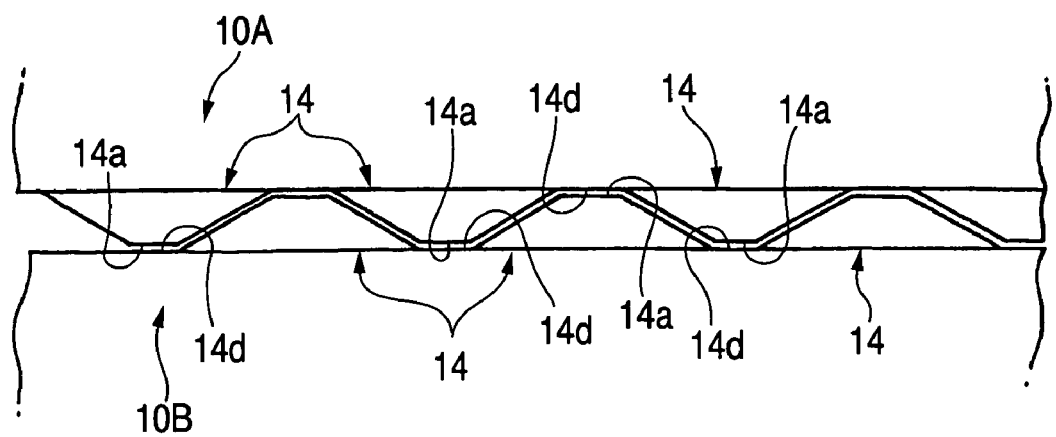
FIG. 10 is a view explaining such a state that a plurality of opposing ribs are engaged mutually in FIG. 9.

FIG. 8 is a view showing such a state that the storing cases of the present embodiment are stacked via their front side surfaces, FIG. 9 is a view explaining such a state that a plurality of ribs are opposed mutually in FIG. 8, and FIG. 10 is a view explaining such a state that a plurality of opposing ribs are engaged mutually in FIG. 9.

As shown in FIG. 9, in case the storing cases 10A, 10B are to be stacked, a plurality of ribs 14 provided to the front side surfaces 12 of the stacked storing cases 10A, 10B respectively are opposed mutually and then the storing cases 10A, 10B are stacked in the directions indicated with an arrow in FIG. 9 respectively, whereby the projected surfaces 14a of the ribs 14 are brought face to face with each other.

Therefore, a plurality of ribs 14 in the present embodiment are formed such that a width (a dimension in the lateral direction in FIG. 9) T of the projected surface 14a is made equal to an interval V of a hollow portion 14d between a plurality of ribs 14. By doing this, the projected surfaces 14a of the ribs 14 provided to one storing case 10A are held between the ribs 14 provided to the other storing case 10B by shifting slightly a plurality of ribs 14 provided to one of storing cases along the planar direction when a plurality of ribs 14 opposed mutually are stacked as shown in FIG. 9.

Hence, as shown in FIGS. 9 and 10, the storing cases 10A, 10B are stacked in transportation in such a way that the ribs 14 of the stacked storing cases 10A, 10B are opposed mutually, the ribs 14 can be engaged with each other. As a result, it can be prevented that the stacked storing cases 10A, 10B lose their balance and fall down.

Also, as shown in FIG. 10, a plurality of opposing ribs 14 are engaged alternately with each other in storing the storing cases 10A, 10B. Therefore, such an event can be avoided that a resultant volume is increased in the thickness direction (vertical direction in FIG. 8) of the storing cases 10A, 10B due to the state that the projected surface 14a of the ribs 14 are brought face to face with each other, and thus a storage space is increased.

In addition, respective ribs 14 are guided to the hollow portions 14d by sliding edge portions of the projected surfaces 14a or the inclined surfaces 14b on the inclined surfaces 14b of the opposing ribs 14. Hence, a plurality of opposing ribs 14 can be engaged smoothly with each other.

In this case, the present invention is not limited to the foregoing embodiment, and appropriate variation, improvement, etc. can be applied.

For example, the storing case 10 is constructed such that a plurality of ribs 14 are provided to the front side surface 12 and the recess region 13b is provided to the back side surface 13. But such a structure may be employed that the recess region 13b is provided to the front side surface 12 and a plurality of ribs are provided to the back side surface 13.

Also, the shape of respective ribs 14 is not limited to that shown in FIG. 1. The shape of respective ribs may be changed appropriately within a scope that such shape of respective ribs can be positioned appropriately in the recess region 13b when the front side surface 12 and the back side surface 13 are stacked. In addition, arrangement of the ribs 14 is not limited to a series arrangement as shown in FIG. 1, and respective ribs 14 may be arranged to shift from the adjacent ribs in the lateral direction of the storing case.

For example, in the above storing case 10, the window portion 12a is provided to the front side surface 12. But the present invention is not limited to this structure, and the structure in which no window portion is provided may be employed.

Figure 11:
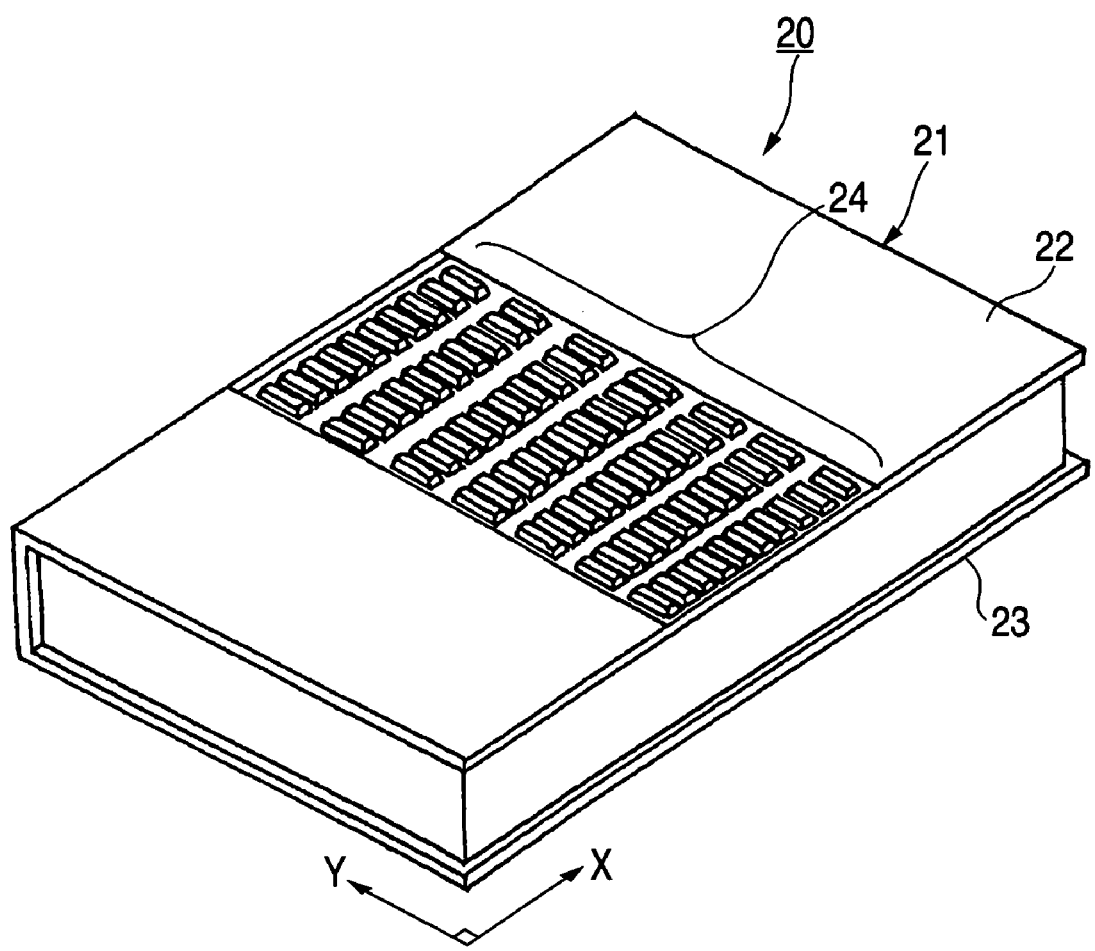
FIG. 11 is an overall perspective view showing a variation of a magnetic cassette tape storing case according to the present invention.

FIG. 11 is an overall perspective view showing a variation of the storing case 10 according to the above embodiment. A storing case 20 has a storing case main body 21, and no window portion is provided to a front side surface 22 of the storing case main body 21. A plurality of ribs 24 are provided to the front side surface 22 of the storing case 20 to extend from a center portion of one long side of the front side surface 22 to a center portion of the other long side in such a manner that these ribs are positioned in a recess region (see FIG. 2) when the front side surface 22 is stacked on a back side surface 23.

According to the storing case 20, the advantages similar to the above embodiment can be achieved.

As described above, according to the present invention, the tape cassette storing case convenient for any handling of the tape cassette storing case such as transportation, storage, or the like can be provided.

The entire disclosure of each and every foreign patent application from which the benefit of foreign priority has been claimed in the present application is incorporated herein by reference, as if fully set forth.

What is claimed is:

1. A tape cassette storing case, comprising:
   a storing case main body for storing a tape cassette, the storing case main body having a first side surface and a second side surface that is opposite to the first side surface;
   a recess region in the first side surface, the recess region being defined by a step from the first side surface; and
   a plurality of ribs on the second side surface, wherein each rib comprises a projected surface supported by inclined surfaces extending from the second side surface,
   wherein when two storing case main bodies including a first main body and a second main body are stacked so that the first side surface in the first main body is superposed on the second side surface in the second main body, said plurality of ribs in the second main body is regulated by the step of the recess region on the first main body, and said plurality of ribs in the second main body each has an inclined surface with respect to the second side surface in the second main body.

2. A tape cassette storing case according to claim 1, wherein the inclined surface and the second side surface define an angle of 20° to 50°.

3. A tape cassette storing case according to claim 1, wherein when two of the storing case main bodies including a first main body and a second main body are stacked so that the second side surface in the first main body is superposed on the second side surface in the second main body, said plurality of ribs in the first main body is capable of engaging with said plurality of ribs on the second main body.

4. A tape cassette storing case according to claim 1, wherein the inclined surface is inclined in a longitudinal direction of the second side surface.

5. A tape cassette storing case according to claim 1, wherein the inclined surface is inclined in a lateral direction of the second side surface.

6. A tape cassette storing case according to claim 1, wherein each of the ribs comprises a first inclined surface in a longitudinal direction of the second side surface and a second inclined surface in a lateral direction of the second side surface.

7. A tape cassette storing case according to claim 1, further comprising a sheet member on the recess region.

8. A tape cassette storing case according to claim 7, wherein the sheet member has a coefficient of friction larger than any other portion than the sheet member in the tape cassette storing case.

9. A tape cassette storing case according to claim 7, wherein a height of the step is set to be greater than a thickness dimension of the sheet member.

10. A tape cassette storing case according to claim 7, wherein at least a portion of the sheet member formed of a resin is deposited in the recess region to form a sheet deposition portion, and the step comprises the sheet deposition portion.

11. A tape cassette storing case according to claim 1, wherein said plurality of ribs is provided at a predetermined interval.

12. A tape cassette storing case according to claim 1, wherein said second side surface is a rectangle having a pair of longitudinal sides and a pair of lateral sides, and said plurality of ribs is provided at a predetermined interval along a said longitudinal side of the second side surface.

13. A tape cassette storing case according to claim 1, wherein said second side surface is a rectangle having a pair of longitudinal sides and a pair of lateral sides, and said plurality of ribs is centered with respect to a said longitudinal side of the second side surface.

14. A tape cassette storing case according to claim 1, wherein said second side surface is a rectangle having a pair of longitudinal sides and a pair of lateral sides, said plurality of ribs comprises two or more groups of ribs, a first group of ribs is provided at a predetermined interval along one said longitudinal side, and a second group of ribs is provided at a predetermined interval along the other said longitudinal side of the second side surface.

15. A tape cassette storing case, comprising:
a storing case main body for storing a tape cassette, the storing case main body having a first side surface and a second side surface that is opposite to the first side surface;
a recess region on the first side surface, the recess region being defined by a step from the first side surface; and
a plurality of ribs on the second side surface,
wherein when two storing case main bodies including a first main body and a second main body are stacked so that the first side surface in the first main body is superposed on the second side surface in the second main body, said plurality of ribs in the second main body is regulated by the step of the recess region on the first main body, and said plurality of ribs in the second main body each has an inclined surface with respect to the second side surface in the second main body, and
wherein said second side surface is a rectangle having a pair of said longitudinal sides and a pair of lateral sides, said plurality of ribs is centered with respect to a longitudinal side, and said plurality of ribs extends from one said longitudinal side to the other said longitudinal side of the second side surface.

* * * * *